US008180635B2

(12) United States Patent
Cui et al.

(10) Patent No.: US 8,180,635 B2
(45) Date of Patent: May 15, 2012

(54) WEIGHTED SEQUENTIAL VARIANCE ADAPTATION WITH PRIOR KNOWLEDGE FOR NOISE ROBUST SPEECH RECOGNITION

(75) Inventors: Xiaodong Cui, White Plains, NY (US); Kaisheng Yao, Bellevue, WA (US)

(73) Assignee: Texas Instruments Incorporated, Dallas, TX (US)

( * ) Notice: Subject to any disclaimer, the term of this patent is extended or adjusted under 35 U.S.C. 154(b) by 772 days.

(21) Appl. No.: 12/347,504

(22) Filed: Dec. 31, 2008

(65) Prior Publication Data
US 2010/0169090 A1 Jul. 1, 2010

(51) Int. Cl.
*G10L 15/20* (2006.01)
(52) U.S. Cl. ...................................... 704/233
(58) Field of Classification Search .................. 704/233
See application file for complete search history.

(56) References Cited

U.S. PATENT DOCUMENTS

| 2005/0216266 | A1* | 9/2005 | Gong et al. ................. 704/256 |
| 2005/0256714 | A1* | 11/2005 | Cui et al. .................. 704/256.4 |
| 2007/0033027 | A1 | 2/2007 | Yao |
| 2007/0033044 | A1 | 2/2007 | Yao |
| 2007/0198265 | A1* | 8/2007 | Yao ........................ 704/254 |
| 2008/0195381 | A1* | 8/2008 | Soong et al. ............... 704/200 |
| 2008/0300875 | A1* | 12/2008 | Yao et al. .................. 704/236 |

OTHER PUBLICATIONS

L. Deng, J. Droppo, and A. Acero, "Recursive estimation of nonstationary noise using iterative stochastic approximation for robust speech recognition," IEEE Trans. on Speech and Audio Processing, vol. II, No. 6, pp. 568-580, 2003.

P.J. Moreno, B. Raj, and R. M. Stern, "A vector Taylor series approach for environment-independent speech recognition," ICASSP, 1996, vol. 2, pp. 733-736.

H. Hermansky, N. Morgan, A. Bayya, and P. Kohn, "Rasta-PLP speech analysis technique," ICASSP, 1992, pp. 121-124.

M. G. Rahim and B. H. Juang, "Signal bias removal by maximum likelihood estimation for robust telephone speech recognition" IEEE Trans. on Speech and Audio Processing, vol. 4, No. 1, pp. 19-30, Jan. 1996.

F. Hilger and H. Ney, "Quantile based histogram equalization for noise robust speech recognition," Eurospeech, 2001, pp. 1135-1138.

MJ.F. Gales and S.J. Young, "Robust speech recognition in additive and convolutional noise using parallel model combination," Computer Speech and Language, vol. 9, pp. 289-307,1995.

A. Sankar and C. H. Lee, "A maximum-likelihood approach to stochastic matching for robust speech recognition," IEEE Trans. on Speech and Audio Processing, vol. 4, No. 3, pp. 190-201, 1996.

(Continued)

*Primary Examiner* — Michael N Opsasnick
(74) *Attorney, Agent, or Firm* — Mima Abyad; W. James Brady; Frederick J. Telecky, Jr.

(57) ABSTRACT

A method for adapting acoustic models used for automatic speech recognition is provided. The method includes estimating noise in a portion of a speech signal, determining a first estimated variance scaling vector using an estimated 2-order polynomial and the noise estimation. The estimated 2-order polynomial represents a prior knowledge of a dependency of a variance scaling vector on noise, determining a second estimated variance scaling vector using statistics from prior portions of the speech signal, determining a variance scaling factor using the first estimated variance scaling vector and the second estimated variance scaling vector, and using the variance scaling factor to adapt an acoustic model.

20 Claims, 13 Drawing Sheets

OTHER PUBLICATIONS

Y. Zhao, "Maximum likelihood joint estimation of channel and noise for robust speech recognition," ICASSP, 2000, vol. 2, pp. 1109-1113.

P. C. Woodland, M. J. F. Gales, and D. Pye, "Improving environmental robustness in large vocabulary speech recognition," ICASSP, 1996, pp. 6-8.

Y. Gong, "A method of joint compensation of additive and convolutive distortions for speaker-independent speech recognition," IEEE Trans. on Speech and Audio Processing, vol. 13, No. 5, pp. 975-983, 2005.

D. Macho, et al, "Evaluation of a noise-robust DSR front-end on AURORA databases," ICSLP, 2002, vol. 1, pp. 17-20.

J. L. Gauvain and C. H. Lee, "Maximum a posteriori estimation for multivariate Gaussian mixture observations of Markov chains," IEEE Trans. on Speech and Audio Processing, vol. 2, No. 2, pp. 291-298, 1994.

O. Siohan, C. Chesta, and C. H. Lee, "Joint Maximum a Posteriori adaptation of transformation and HMM parameters," IEEE Trans. on Speech and Audio Processing, vol. 9, No. 4, pp. 417-428, 2001.

W. Chou and X. He, "Maximum a posterior linear regression based variance adaptation of continuous density HMMs," Tech. Rep. ALR2002-045, Avaya Labs. Research, 2002.

M. Berouti, R. Schwartz, and J. Makhoul, "Enhancement of speech corrupted by acoustic noise," ICASSP, Apr. 2000, pp. 208-211.

* cited by examiner

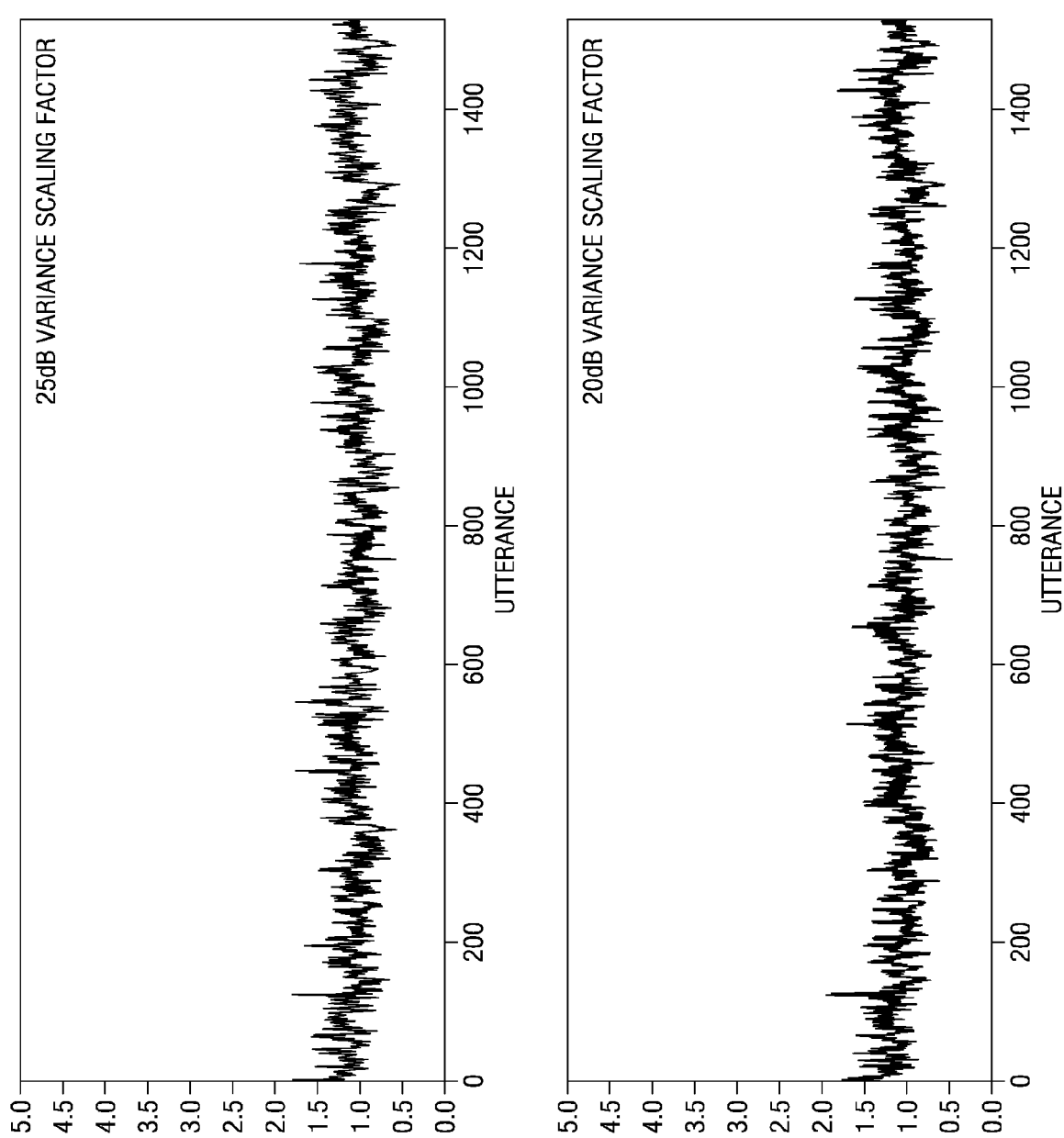

WEIGHTED SEQUENTIAL VARIANCE ADAPTATION WITH PRIOR KNOWLEDGE FOR NOISE ROBUST SPEECH RECOGNITION

BACKGROUND OF THE INVENTION

Over the last few decades, the focus in automatic speech recognition (ASR) has gradually shifted from laboratory experiments performed on carefully enunciated speech received by high-fidelity equipment in quiet environments to real applications having to cope with normal speech received by low-cost equipment in noisy environments. In noisy environments, an ASR system may often be required to work with mismatched conditions between pre-trained speaker-independent acoustic models and a speaker-dependent voice signal.

Mismatches are often caused by environmental distortions. These environmental distortions may be additive in nature from background noise such as a computer fan, a car engine, wind noise, or road noise (see, e.g., Gong, "A Method of Joint Compensation of Additive and Convolutive Distortions for Speaker-Independent Speech Recognition," IEEE Trans. on Speech and Audio Processing, vol. 13, no. 5, pp. 975-983, 2005) or convolutive in nature from changes in microphone type (e.g., a hand-held microphone or a hands-free microphone) or position relative to the speaker's mouth. Speaker-dependent characteristics, such as variations in vocal tract geometry also introduce mismatches. These mismatches tend to degrade the performance of an ASR system dramatically. In mobile ASR applications, these distortions occur routinely. Therefore, a practical ASR system needs to be able to operate successfully despite these distortions.

Hidden Markov models (HMMs) are widely used in the current ASR systems. The above distortion may affect HMMs by, for example, shift of mean vectors or additional biases to the pre-trained mean vectors. Many techniques have been developed in an attempt to compensate for these distortions. Generally, the techniques may be classified into two approaches: front-end techniques that recover clean speech from a noisy observation (see, e.g., Macho, et al., "Evaluation of a Noise-Robust DSR Front-End on Aurora Databases," in ICSLP, 2002, vol. 1, pp. 17-20, Deng, et al., "Recursive Estimation of Nonstationary Noise Using Iterative Stochastic Approximation for Robust Speech Recognition," IEEE Trans. on Speech and Audio Processing, vol. 11, no. 6, pp. 568-580, 2003, Moreno, et al., "A Vector Taylor Series Approach for Environment-Independent Speech Recognition," in ICASSP, 1996, vol. 2, pp. 733-736, Hermansky, et al., "Rasta-PLP Speech Analysis Technique," in ICASSP, 1992, pp. 121-124, Rahim, et al., "Signal Bias Removal by Maximum Likelihood Estimation for Robust Telephone Speech Recognition," IEEE Trans. on Speech and Audio Processing, vol. 4, no. 1, pp. 19-30, January 1996, and Hilger, et al., "Quantile Based Histogram Equalization for Noise Robust Speech Recognition," in EUROSPEECH, 2001, pp. 1135-1138) and back-end techniques that adjust model parameters to better match the distribution of a noisy speech signal (see, e.g., Gales, et al., "Robust Speech Recognition in Additive and Convolutional Noise Using Parallel Model Combination," Computer Speech and Language, vol. 9, pp. 289-307, 1995, Sankar, et al., "A Maximum-Likelihood Approach to Stochastic Matching for Robust Speech Recognition," IEEE Trans, on Speech and Audio Processing, vol. 4, no. 3, pp. 190-201, 1996, Zhao, "Maximum Likelihood Joint Estimation of Channel and Noise for Robust Speech Recognition," in ICASSP, 2000, vol. 2, pp. 1109-1113, Woodland, et al., "Improving Environmental Robustness in Large Vocabulary Speech Recognition," in ICASSP, 1996, pp. 65-68, and Chou, "Maximum a Posterior Linear Regression based Variance Adaptation of Continuous Density HMMs," Technical Report ALR-2002-045, Avaya Labs Research, 2002).

Many of these approaches are not suitable for current mobile devices due to their memory usage and/or power consumption requirements. Further, while some approaches may achieve good performance when the signal to noise ratio (SNR) is homogeneous from utterance to utterance, their performance is degraded when there is a dramatic environmental change across a sequence of utterances, e.g., significant SNR variation from previous utterance to current utterance. Accordingly, improvements in automatic speech recognition to make ASR systems in mobile devices more robust to channel and noise distortion are desirable.

SUMMARY OF THE INVENTION

Embodiments of the invention provide methods, speech recognition systems, and digital systems for adapting acoustic models. In particular, embodiments of the invention provide a method for adapting acoustic models that includes estimating noise in a portion of a speech signal, determining a first estimated variance scaling vector using an estimated 2-order polynomial and the noise estimation, wherein the estimated 2-order polynomial represents a priori knowledge of a dependency of a variance scaling vector on noise, determining a second estimated variance scaling vector using statistics from prior portions of the speech signal, determining a variance scaling factor using the first estimated variance scaling vector and the second estimated variance scaling vector, and using the variance scaling factor to adapt an acoustic model. Embodiments of the invention also include a speech recognition system and a digital system configured to execute the method.

BRIEF DESCRIPTION OF THE DRAWINGS

Particular embodiments in accordance with the invention will now be described, by way of example only, and with reference to the accompanying drawings:

FIGS. 2A-2C and 3A-3C show sequentially estimated variance scaling factors under background noise with various signal to noise ratios in accordance with one or more embodiments of the invention;

DETAILED DESCRIPTION OF EMBODIMENTS OF THE INVENTION

Figure 1:
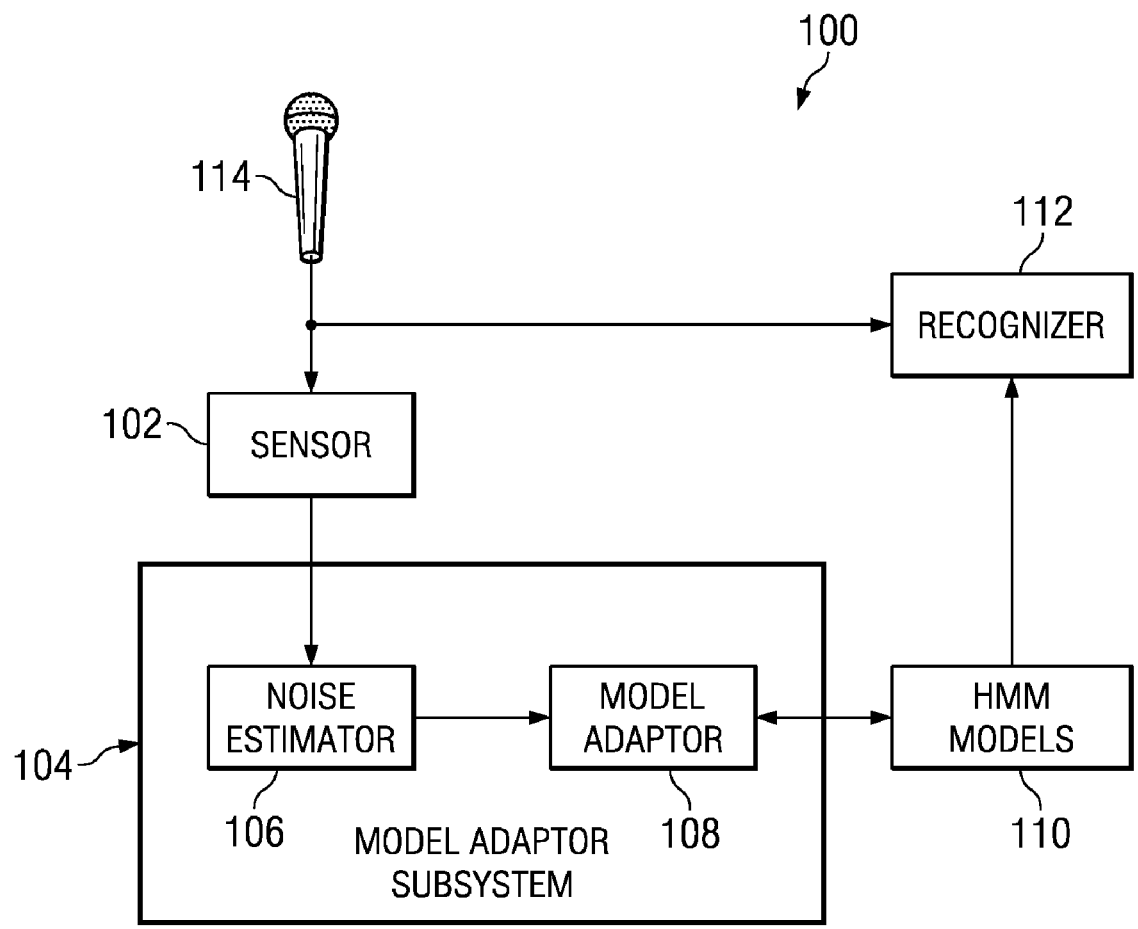
FIG. 1 shows an automatic speech recognition system (ASR) in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

Embodiments of the invention provide methods and systems for a modified form of sequential variance adaptation (SVA) of acoustic models, e.g., hidden Markov models (HMMs), which uses prior variance knowledge. More specifically, acoustic models are adapted using a variance scaling vector estimated based on statistics from previous utterances and the variance scaling vector estimated based on a priori knowledge of the dependency of the variance scaling vector on noise level estimates. Further, some embodiments of the invention provide methods and systems for modified SVA of acoustic models using a weighted combination of the two estimated variance scaling vectors.

Sequential variance adaptation (SVA) as taught in the prior art adapts acoustic models using statistics from previous utterances. See, e.g., U.S. Patent Publication No. 2005/0256714, incorporated herein by reference. While SVA provides good performance in homogeneous environments, SVA performance may be degraded when there is dramatic environment variation due to its sequential nature. As is explained in more detail herein, using SVA in combination with prior variance-environment knowledge to adapt the acoustic models mitigates the degradation. Collected samples of the variance scaling vector for utterances show that the variance scaling vector for an utterance is dependent on the noise level present during the utterance. In embodiments of the invention, a 2-order polynomial regression is trained for each element of the variance scaling vector. During the course of actual speech recognition in an ASR system, for each utterance, an estimate of the variance scaling vector based on the 2-order polynomial regression and an estimate of the background noise for the utterance is added to the estimate of the variance scaling vector estimated using SVA, i.e., estimated using statistics from prior utterances, to compute an improved estimate of the variance scaling vector. The resulting estimated variance scaling vector is then used to adapt the acoustic models for use in recognition of the next utterance. Further, this improved estimate is more robust to background noise in a mobile computing environment than the SVA estimate alone.

The modified SVA described herein does not require acoustic models to be retrained using data collected from many environments as is required by multi-condition training methods such as the one described in Macho, et al., "Evaluation of a Noise-Robust DSR Front-End on Aurora Databases," in ICSLP, 2002, vol. 1, pp. 17-20. Instead, a 2-order polynomial of the dependency of the variance scaling vector on the noise level is trained off-line. The polynomial is concise and provides prior knowledge of the variance scaling vector once the noise-level is estimated. Therefore, the acoustic models can be much more compact than those for the multi-condition training approach. Further, the modified SVA does not require tens of adaptation utterances to yield improved performance as so some adaptation approaches such as the maximum-likelihood linear regression approach as described in Woodland, et al., "Improving Environmental Robustness in Large Vocabulary Speech Recognition," in ICASSP, 1996, pp. 65-68. Instead, a priori knowledge is used to improve performance when adaptation data is limited. As in shown by the experimental results provided herein, the modified SVA improves performance when the noise level varies across utterances whereas MLLR may degrade in such an environment. Further, the modified SVA explicitly represent the dependency of the variance scaling vector on the noise level whereas other adaptation methods that use a priori knowledge, such as Chou, "Maximum a Posterior Linear Regression based Variance Adaptation of Continuous Density HMMs," Technical Report ALR-2002-045, Avaya Labs Research, 2002, that is vague and therefore needs many utterances, e.g., 20, to achieve improved performance.

FIG. 1 shows an automatic speech recognition (ASR) system (100) in accordance with one or more embodiments of the invention. As shown in FIG. 1, the ASR system (100) includes a microphone (114) to receive speech utterances to be recognized, a noise sensor (102), a model adaptor subsystem (104), HMM models (110), and a recognizer (112). The model adaptor subsystem (104) provides functionality to adapt the HMM models for each utterance using a variance scaling vector estimated based on statistics from previous utterances and a variance scaling vector estimated based on a priori knowledge of the dependency of the variance scaling vector on noise level estimates. The recognizer (112) includes functionality to use the adapted HMM models (110) to recognize speech from the utterances received by the microphone (114). In one or more embodiments of the invention, the model adaptor subsystem includes a processor (e.g., a digital signal processor) that operates on the noise sensed by the noise sensor (102), performs the variance scaling vector estimates, and modifies the HMM Models (110).

The model adaptor subsystem (104) further includes a noise estimator (106) and a model adaptor (108). The noise sensor (102) detects background noise during a pre-utterance pause and provides the detected background noise to the noise estimator (106). The noise estimator (106) includes functionality to estimate the background noise from the detected background noise and provide the estimate to the model adaptor (108). Any suitable approach for noise estimation may be used. However, in one or more embodiments of the invention, noise estimation is performed using silence intervals at the beginning of an utterance plus any silence intervals within an utterance. Since silence intervals are unlikely for a vocabulary of words or other short audio units, noise estimation is performed just prior to an utterance and is presumed constant during the utterance.

The model adaptor (108) includes functionality to estimate the variance scaling vector for each utterance and to use the estimated variance scaling vector to adapt the HMM models (110). As is explained in more detail below, the variance scaling vector is estimated by adding two estimated variance scaling vectors: one determined from statistics from previous utterances, i.e., using SVA, and the other determined from a priori knowledge of the dependency of the variance scaling vector on noise level estimates, i.e., using a 2-order polynomial regression trained for each element of the variance scaling vector in combination with the noise estimate from the noise estimator (106). Further, in some embodiments of the invention, the model adaptor (108) includes functionality to weight the two estimated variance scaling vectors to compensate for noise estimation errors. The weighting is explained in more detail below.

SVA, as explained in more detail in U.S. Patent Publication No. 2005/0256714, adjusts the variance of HMMs using a global scaling vector, i.e., a variance scaling vector. This global scaling vector is estimated based on statistics from previous utterances. More specifically, SVA dynamically adapts the covariances of the HMMs sequentially based on the sequential Estimation Maximization (EM) algorithm. The covariances in the HMMs are adjusted by scaling matrices that are sequentially updated each time new data from a speech signal is available, e.g., for each utterance in a speech signal.

SVA assumes that the d-th variance element $\Sigma_d$ is scaled by a factor $\exp(\rho_d)$. The log-likelihood of observing Y(t) at time t given model $\Lambda$ is then re-written as $$\mathcal{L}(Y(t) \mid \rho, \Lambda) \propto -\frac{1}{2}(Y(t)-\mu)^2 \Sigma^{-1} \exp(-\rho) - \frac{1}{2}\rho - \frac{1}{2}\log\Sigma \quad (1)$$

where $\mu$ denotes the mean of an HMM and $\Sigma$ denotes the variance vector of an HMM. Y(t) (t) is an observation at time t.

To estimate the variance scaling vector $\rho$ from noisy environments, an EM algorithm is derived. The stochastic approximation function to update $\rho$ is given below:

$$\hat{\rho} = \rho - \frac{\sum_{mt}\gamma_m(t)\left[\frac{-1}{2} + \frac{1}{2}(Y(t)-\mu)^2\Sigma^{-1}\exp(-\rho)\right]}{\sum_{mt}\gamma_m(t)\left[\frac{-1}{2}(Y(t)-\mu)^2\Sigma^{-1}\exp(-\rho)\right]} \quad (2)$$

where $\hat{\rho}$ is the updated estimate of the variance scaling vector $\rho$ and $\gamma_m(t)$ is the posterior probability of state m at time t given the entire utterance sequence.

Theoretically, the SVA by the above stochastic approximation (2) converges as long as the environmental statistics are stationary and the sequence is long enough, i.e., $$\hat{\rho} \to \bar{\rho} \text{ as } n \to \infty$$

where $\bar{\rho}$ is the stationary estimate of $\rho$. However, dramatic or even slow changes of background noise can break stationary environmental statistics. That is, the assumption of infinite stationary observations, i.e., $n \to \infty$, cannot be applied in practice.

Figure 2A:
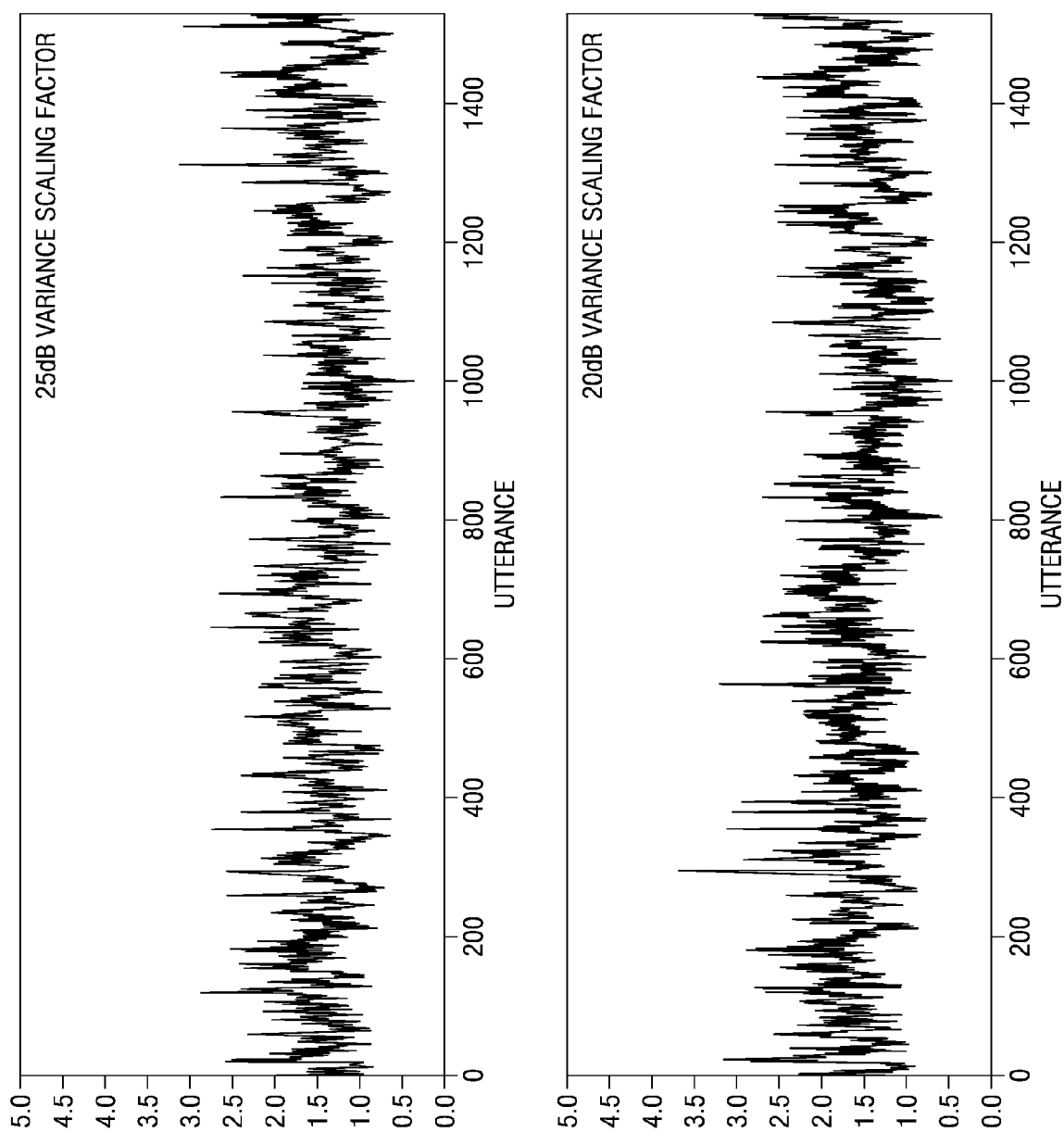
Figure 2B:
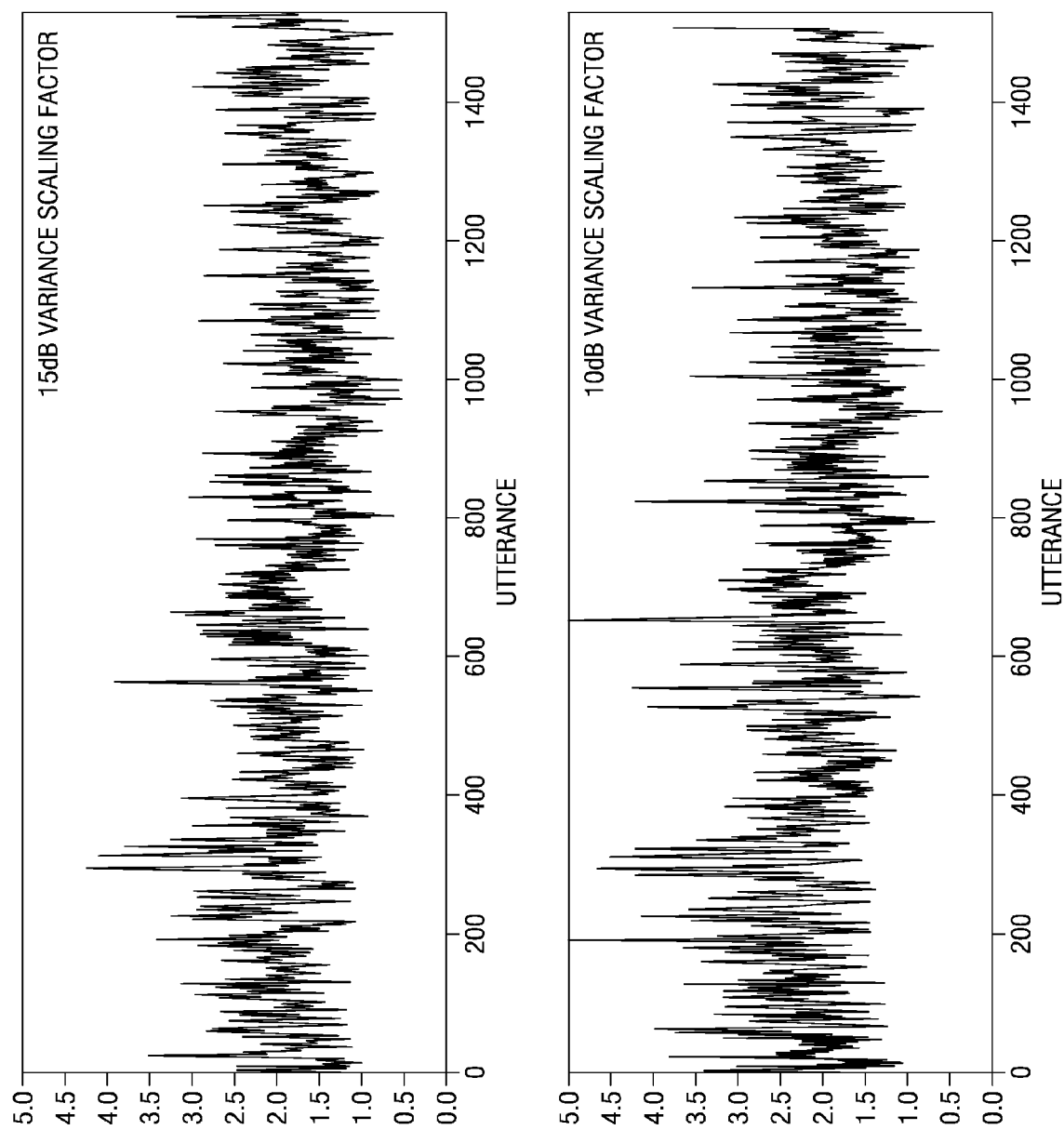
Figure 2C:
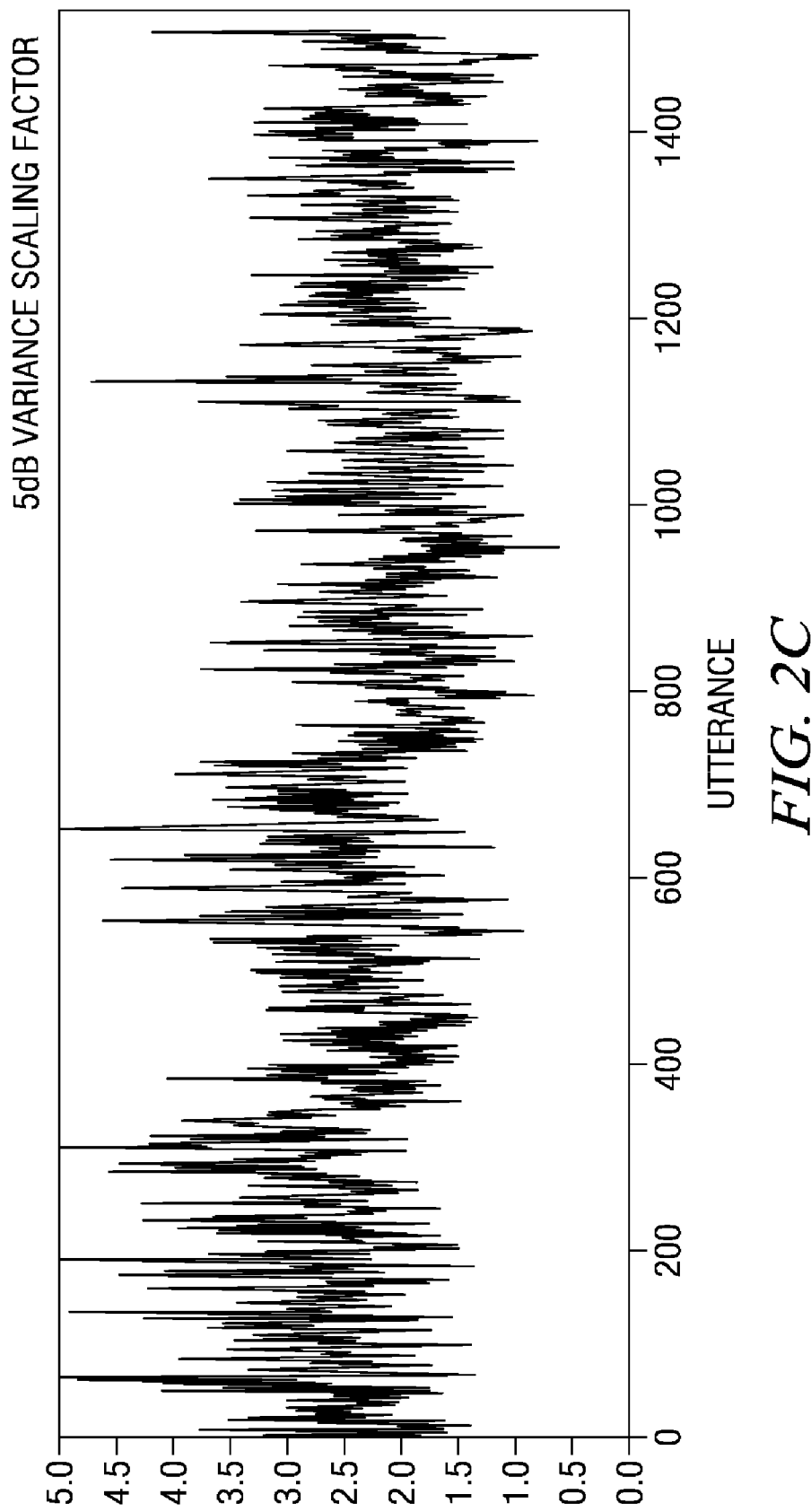
Figure 3B:
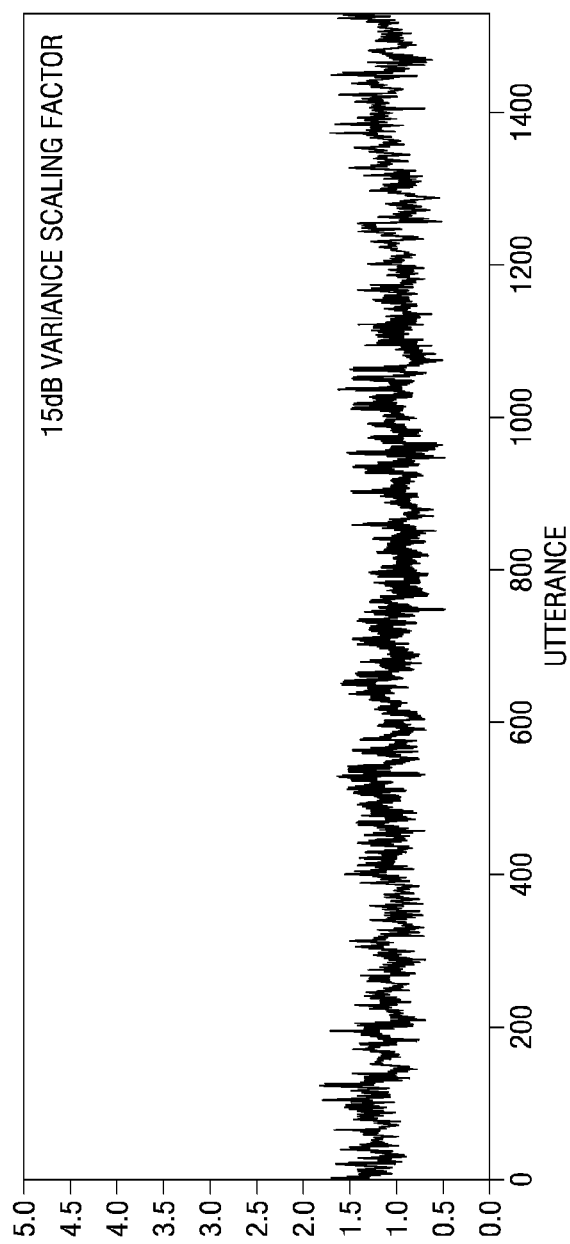
Figure 3B:
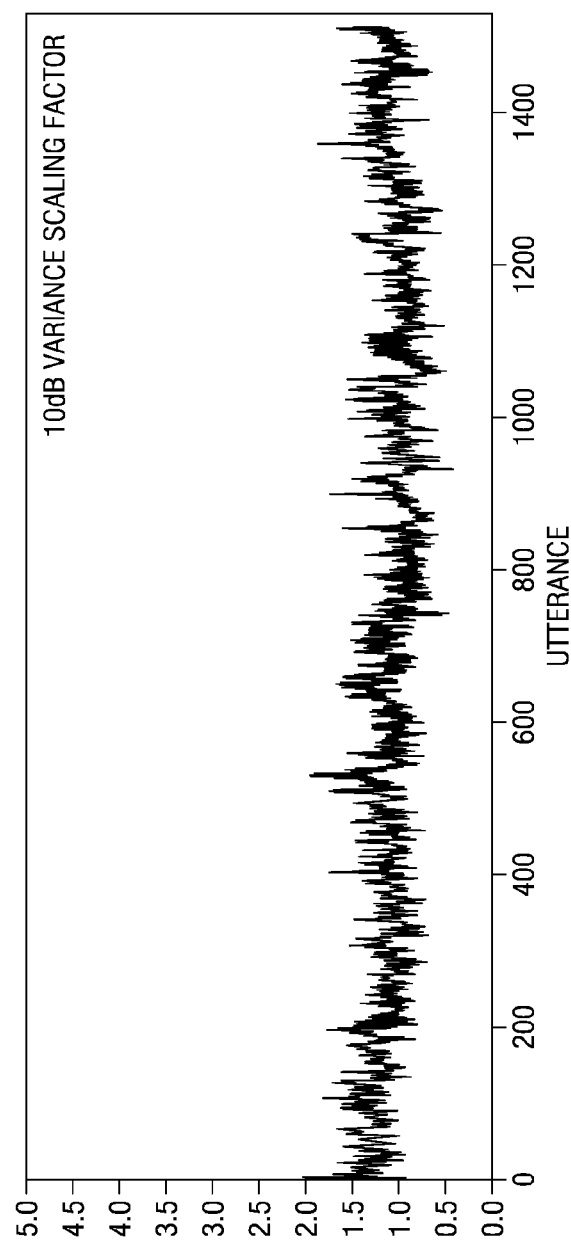
Figure 3C:
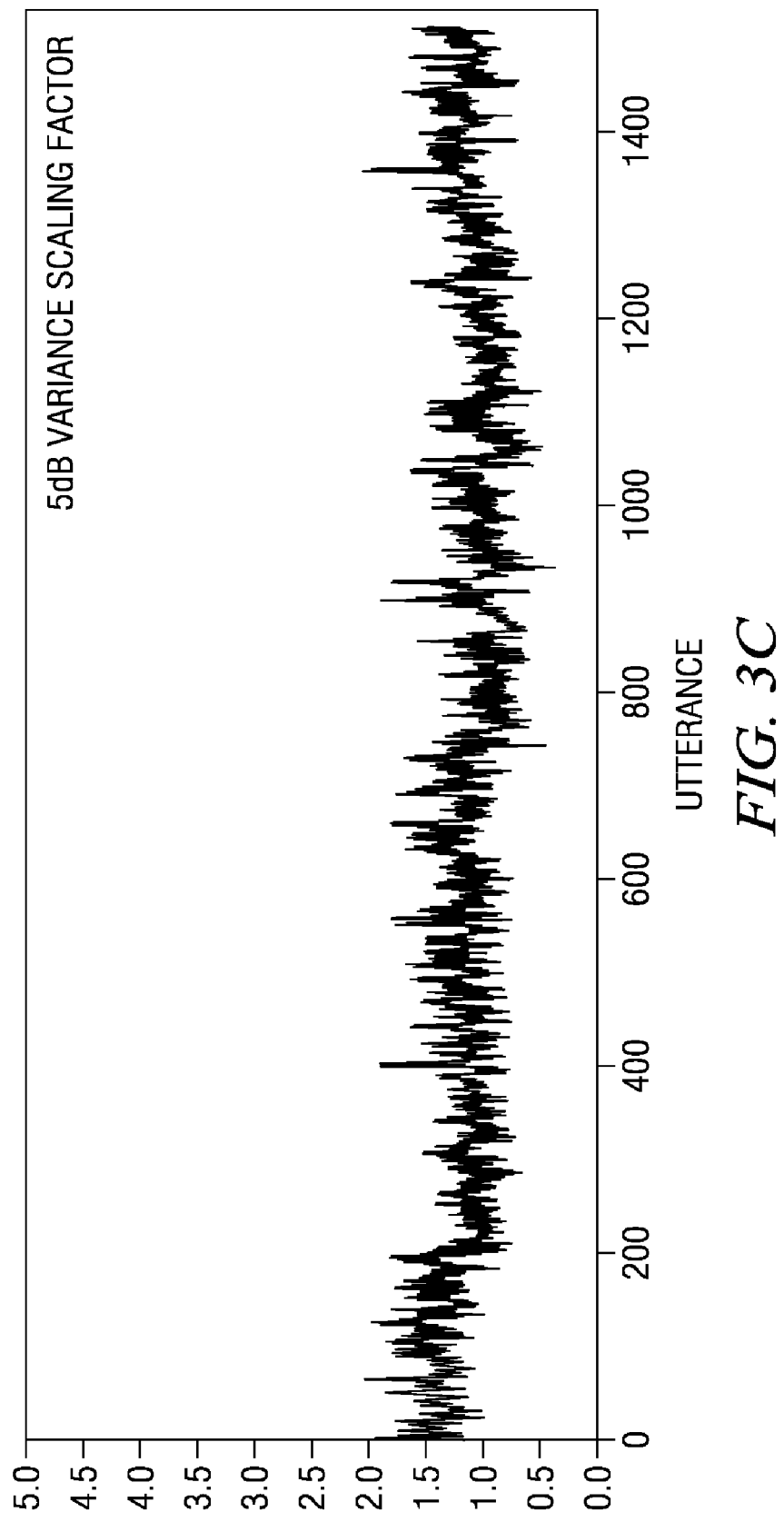

However, for relatively homogeneous environments, a variance scaling vector that is particular to the environment can be obtained in the normal sequential way after many utterances. FIGS. 2A-2C and 3A-3C show examples of sequentially estimated variance scaling vectors under background noise with various signal to noise ratios (SNRs). Specifically, FIGS. 2A-2C show sequentially estimated variance scaling factors for C0, which is the 0-th element of the Mel Frequency Cepstral Coefficient (MFCC) observation vector, under mixed eight types of background noise under 25 dB, 20 dB, 15 dB, 10 dB, and 5 dB SNRs and FIGS. 3A-3C show sequentially estimated variance scaling factors for C5, the 5-th element of the MFCC observation vector, under mixed eight types of background noise under 25 dB, 20 dB, 15 dB, 10 dB, and 5 dB SNRs. Since only the utterance SNRs are fixed while speakers, words, and types of noise change across utterances, these figures show no clear trend of convergence. However, the estimated variance scaling factors do show a difference in value under different SNRs.

Figure 4A:
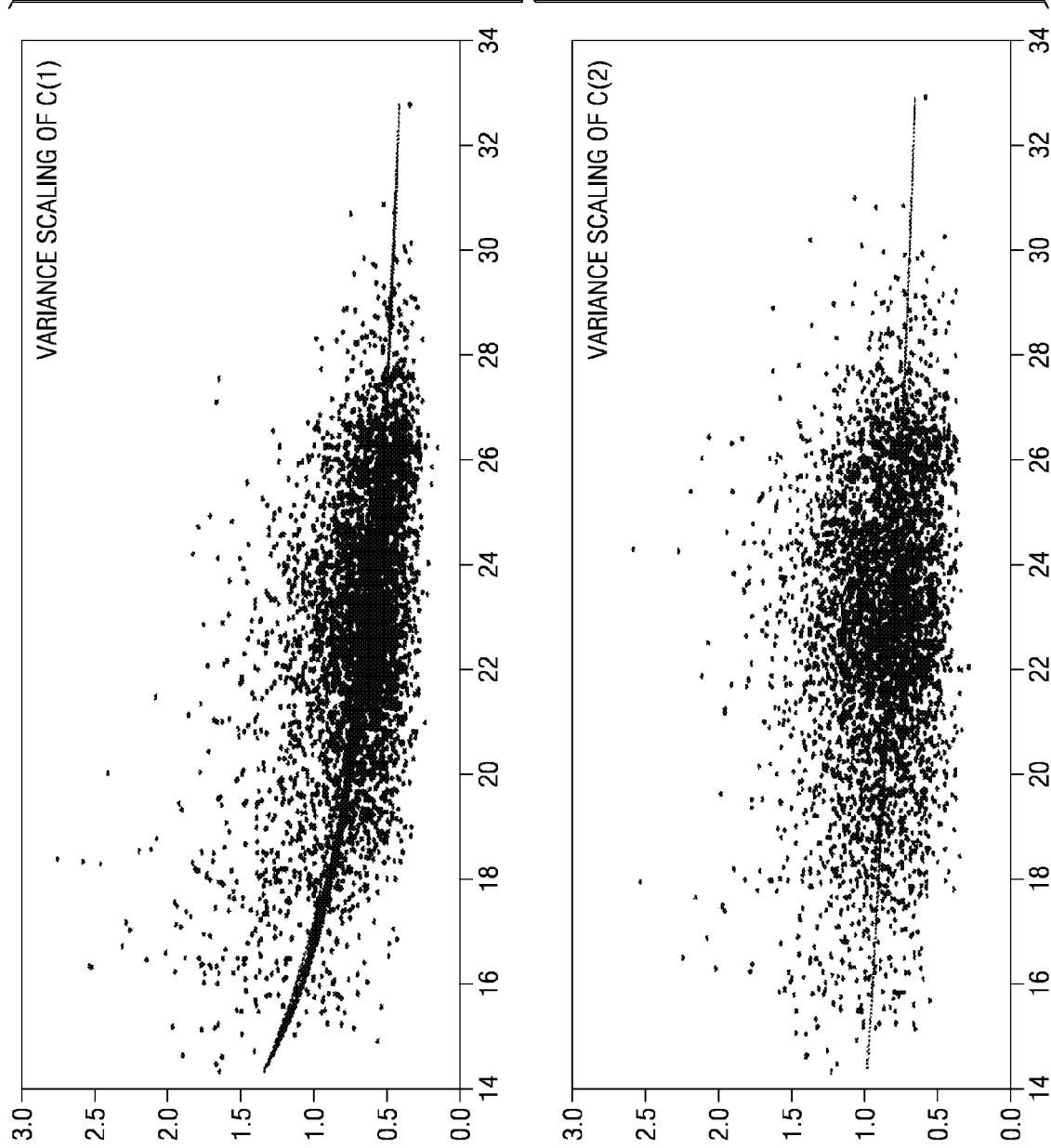
FIGS. 4A-4C show the polynomial regression of variance scaling as a function of the noise level in accordance with one or more embodiments of the invention.
Figure 4B:
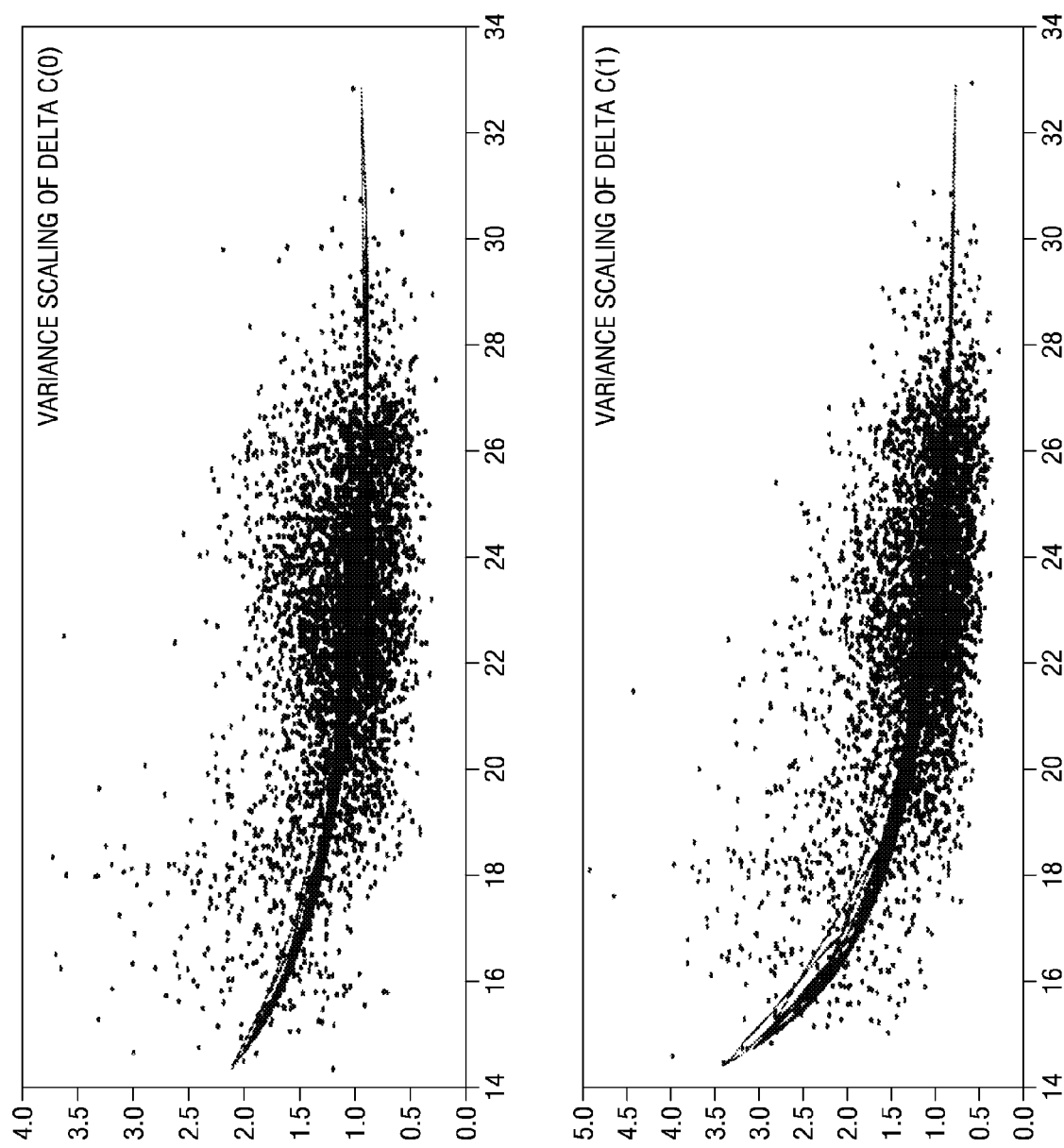
Figure 4C:
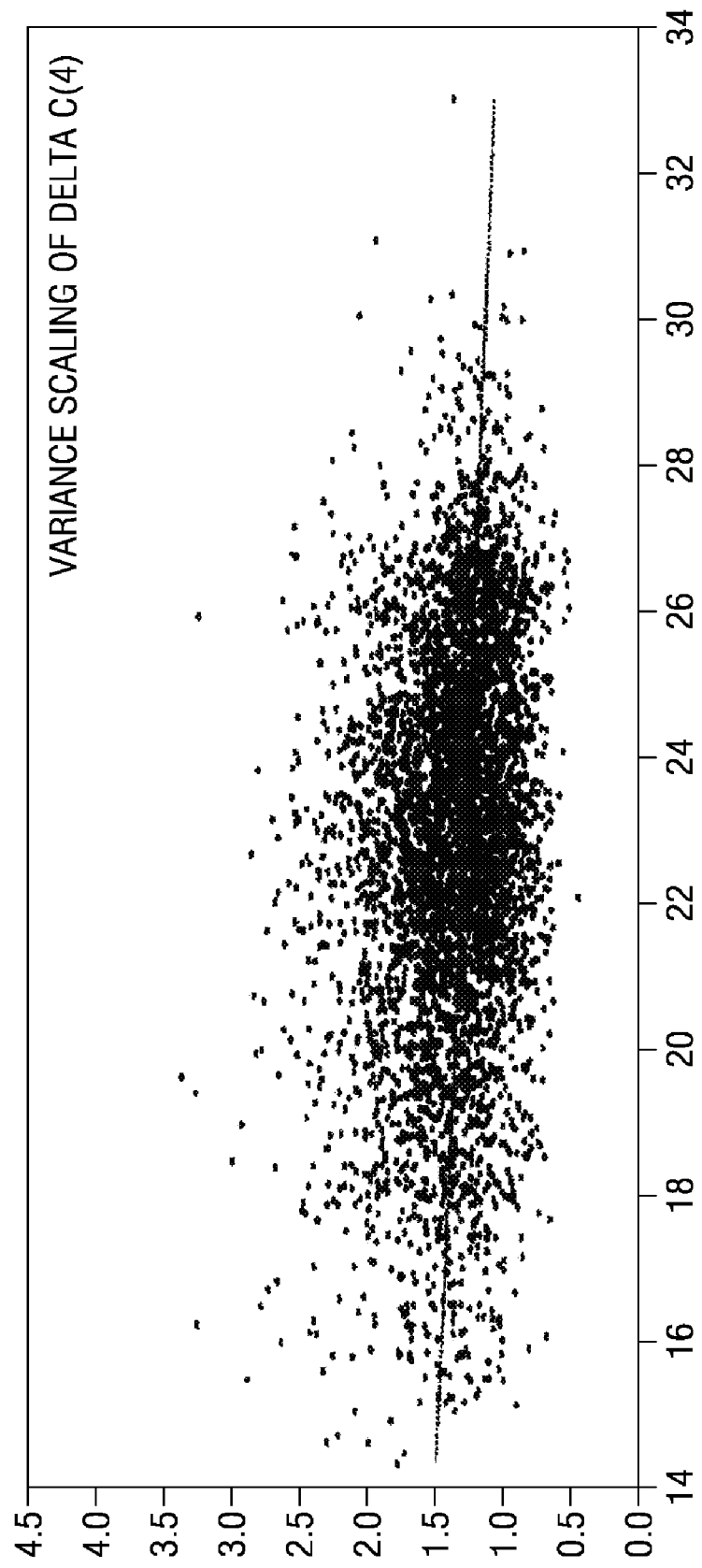
Figure 5:
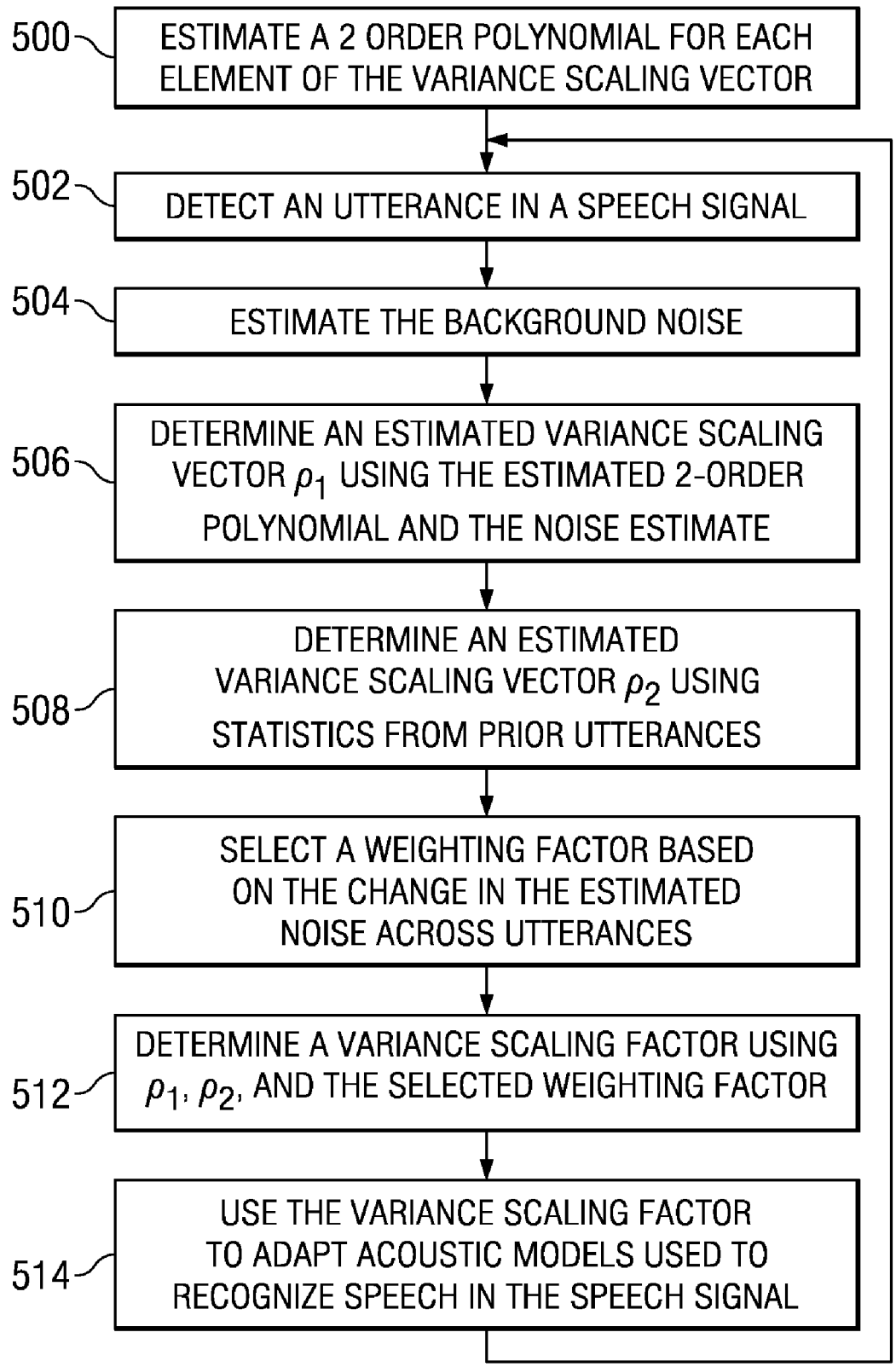
FIG. 5 shows a flow diagram of a method in accordance with one or more embodiments of the invention.

As can be seen from these figures, for each dimension, the variance scaling vector $\rho$ is a function of noise level. This variation of $\rho$ over noise-level may be described as a 2nd-order polynomial. In particular, the sequentially estimated $\rho$'s using SVA for the last few utterances (e.g., 20) are plotted in FIGS. 4A-4C. Specifically, FIGS. 4A-4C show the polynomial regression of variance scaling as a function of the noise level. The horizontal axis is the noise level and the vertical axis is the estimates of the variance scaling vector. The five graphs show, respectively, the polynomial regression for C1, C2, $\Delta$C0, $\Delta$C1, and $\Delta$C4. C1 and C2 each denote the 1st and 2nd elements of the MFCC vector. $\Delta$C0, $\Delta$C1, and $\Delta$C4 denote the 0th, 1st, and 4th elements of a differential MFCC vector, which is obtained by time differences of MFCC vectors. As can be seen from these graphs, the 2-order polynomials, which are shown in real curve, fit well to the samples. Thus, these polynomials may provide a priori knowledge of the variance scaling.

In one or more embodiments of the invention, a 2-order polynomial is estimated for each element of the variance scaling vector. The estimation is obtained by minimum square error (MSE) estimation of the 2-order polynomial regression on a collection of the estimated variance scaling vectors; i.e., $$(\hat{a}_d, \hat{b}_d, \hat{c}_d) = \operatorname*{argmin}_{f_d}(|\rho_d - f_d(N)|^2) \quad (3)$$

where $f_d(N) = a_d N^2 + b_d N + C_d$ is the 2-order polynomial for the d-th element of the variance scaling vector, N denotes the noise level, $a_d$, $b_d$ and $c_d$ are the regression coefficients, and Pd is the converged estimate from SVA in the last few utterances. The collection of the estimated variance scaling vectors is obtained beforehand from a set of experiments, from which a variance scaling factor is estimated using Eq. (2). $\hat{a}_d$, $\hat{b}_d$, $\hat{c}_d$ denote the best polynomial regression coefficients in a $f_d(N)$ that results in the minimum mean square distance, defined in the right hand side of Eq. (3)

During speech recognition, the estimated 2-order polynomial is used to provide an estimate of the variance scaling vector $\rho_1$ given an estimate of the noise level for each utterance; i.e., $$\rho_1 = \hat{a}N^2 + \hat{b}N + \hat{c} \quad (4)$$

where N denotes the estimated noise level. In addition, an estimate of the variance scaling vector $\rho_2$ is generated for each utterance using equation (2). In one or more embodiments of the invention, the variance scaling factor $\exp(\rho)$ is a linear combination of $\exp(\rho_1)$ and $\exp(\rho_2)$, i.e., $$\exp(\rho)=\exp(\rho_1)+\exp(\rho_2)$$

To determine $\rho_1$, the noise level is estimated which may introduce estimation errors. This type of error, especially in low SNR conditions where the scaling vector is more sensitive to the estimation error, may affect the variance scaling vector which in turn may negatively affect the HMMs adapted with the variance scaling vector. Therefore, in one or more embodiments of the invention, an empirically determined weighting factor is used to mitigate possible noise estimation error. When the weighting factor is used, the variance scaling factor computed by the stochastic approximation in equation (2), i.e., $\exp(\rho)$ is a linear combination of $\exp(\rho_1)$ computed from the polynomial in equation (4) and $\exp(\rho_2)$ $$\exp(\rho)=\omega\exp(\rho_1)+(1-\omega)\exp(\rho_2) \quad (5)$$

Equation 5 shows a tradeoff between the prior knowledge ($\rho_1$) and the estimate using statistics from the previous utterance. The tradeoff is achieved using a weighting factor $\omega$. For instance, when the environment changes slowly and the environment in the previous utterance is similar to the current testing condition, the weight factor $\omega$ can be set to a value close to 0.0. In this case, the value of $\exp(\rho)$ is almost $\exp(\rho_2)$. On the other hand, when the environment changes dramatically, the environment in the previous utterance cannot be considered as close to the current one and $\omega$ can be set to close to 1.0. In this condition, $\exp(\rho)$ is almost equal to $\exp(\rho_1)$.

In some embodiments of the invention, the weighting factor $\omega$ may change with respect to the immediate noise level variation across utterances:

$$\omega=f(\Delta noiselevel) \quad (6)$$

That is, if there is no dramatic change in SNR across utterances, the weighting factor used favors $\rho_2$ computed using the statistics from the last utterance. Otherwise, the weighting factor used favors $\rho_1$ computed using the polynomial. Based on experimental observations, the weighting factor for each utterance may be determined based on the following quantized function of the noise level changes:

$$w = \begin{cases} 0.2, & \Delta noiselevel < 8 \\ 0.6, & \text{otherwise} \end{cases}$$

FIG. 2 is a flow diagram of a method for adapting acoustic models used for speech recognition using weighted SVA with prior knowledge in accordance with one or more embodiments of the invention. While this method is presented and described as performing acoustic model adaptation on a per utterance basis, one of ordinary skill in the art will understand that the adaptation may be done at other length intervals in a speech signal, such as, for example, for every n utterances, for every frame, after a predetermined time period (e.g., n seconds, n minutes), etc. As shown in FIG. 2, a 2-order polynomial is estimated for each element of a variance scaling vector (500). That is, a 2-order polynomial regression is trained for each element of a variance scaling vector to estimate the 2-order polynomial. More specifically, the estimation of the 2-order polynomial is obtained by applying SVA to speech samples under a variety of noise conditions to estimate variance scaling vectors that are used in equation 3 to determine regression coefficients for the 2-order polynomial to be used during live speech recognition, e.g., when a user is using a mobile device including ASR. These regression coefficients represent a priori knowledge of the dependency of the variance scaling vector on noise. The resulting estimated 2-order polynomial is shown in equation (4).

After 2-order polynomial is estimated, it is used to adapt acoustic models during automatic speech recognition. More specifically, an utterance is detected in a speech signal (502). After the utterance is detected, the background noise is estimated (504). The noise estimate and the estimated 2-order polynomial are then used to determine an estimated variance scaling vector $\rho_1$ (506). More specifically, $\rho_1$ is determined using equation 4. An estimated variance scaling vector $\rho_2$ is also determined using statistics from prior utterances, i.e., using SVA (508). More specifically, $\rho_2$ is determined using equation (2).

A weighting factor to be used to determine the variance scaling factor is also selected based on the change in estimated noise across utterances (510). In one or more embodiments of the invention, one of two empirically determined weighing factors may be used. The smaller weighting factor, e.g., 0.2, is selected when the change in the noise level is less than 8 dB; otherwise, the larger weighting factor, e.g., 0.6, is selected. Other empirical values can be set in the above quantization function of the noise level changes.

A variance scaling factor is then determined using $\rho_1$, $\rho_2$, and the selected weighting factor (512). More specifically, the variance scaling factor is determined using equation (5). The resulting variance scaling factor is then used to adapt the acoustic models used to recognize speech in the speech signal. In one or more embodiments of the invention, the adapted acoustic models are used for the next utterance. This adaptation process (502-514) is repeated for each utterance in the speech signal.

Experimental results show the possible speech recognition performance improvement using the modified SVA described herein. For the experiments, a database of speech signals was recorded in a vehicle, using an AKG M2 hands-free distant talking microphone, in three recording sessions: parked (car parked, engine off), stop-n-go (car driven on a stop and go basis), and highway (car driven on a highway). Therefore, the many of the utterances in the database were noisy. The database contains 1325 English name utterances. In addition, multiple speakers were used which yielded multiple pronunciations of the names.

The baseline acoustic models used were 4 mixture/state CD-HMMs. A Gaussian mixture tying scheme was used to effectively share Gaussian density. The acoustic models were separately trained for a floating point system and for a fixed-point system. The floating point system was trained using a 5000 word database generated from a corpus of Wall Street Journal news text. The fixed-point system was trained using a database having 7979 words and 93,667 isolated-word utterances spoken by 1358 talkers. Two sets of speech signal data were tested. In one set, denoted as the categorized condition (CTG), utterances were arranged according to the three driving conditions. In the second set, denoted as MIX, utterances from the highway, stop-n-go, and parked conditions were mixed.

Table 1 and Table 2 show test results using the acoustic models trained for a floating point system. Features were 10-dimension static MFCCs and 10-dimension dynamic MFCCs. Based on performances of going through (0.1-0.9) at a step of 0.1, $\omega=0.4$ used in Eq. (5) was found to yield the best performance. In the experiments, SVA and the modified SVA (i.e., weighted SVA) described herein were evaluated with joint compensation of additive noise and convolutive distortion (JAC), described in Gong, "A Method of Joint Compensation of Additive and Convolutive Distortions for Speaker- Independent Speech Recognition," IEEE Trans. on Speech and Audio Processing, vol. 13, no. 5, pp. 975-983, 2005, stochastic bias compensation (SBC) as described in Yao, U.S. Patent Publication 20070033027 filed Apr. 6, 2006, and a spectral subtraction technique (SS), described in Berouti, et al., "Enhancement of Speech Corrupted by Acoustic Noise," ICASSP, April 2000, pp. 208-211. A number of weighting schemes were considered. The resulting word error rates (WER) are shown in Tables 1 and 2. In these tables, SVA stands for the unmodified SVA while WSVA stands for the weighted SVA described herein. In the results of Table 1, the weighting factor is fixed as 0.4. In the results of Table 2, the weighting factor is a function of $\Delta SNR$: $\omega=0.4$ if $\Delta SNR>20$ dB and $\omega=0.2$ otherwise.

TABLE 1

| Condition | Parked | Stopngo | Hiway |
| --- | --- | --- | --- |
| SVA (CTG) | 0.26 | 0.96 | 2.85 |
| WSVA (CTG) | 0.14 | 0.86 | 3.25 |
| WSVA + SS (CTG) | 0.14 | 0.86 | 3.25 |
| SVA (MIX) | 0.90 | 1.85 | 7.08 |
| WSVA (MIX) | 0.24 | 1.53 | 5.27 |
| WSVA + SS (MIX) | 0.28 | 1.49 | 5.65 |

TABLE 2

| Condition | Parked | Stopngo | Hiway |
| --- | --- | --- | --- |
| SVA (CTG) | 0.26 | 0.96 | 2.85 |
| WSVA (CTG) | 0.14 | 0.86 | 3.25 |
| WSVA + SS (CTG) | 0.14 | 0.86 | 3.25 |
| SVA (MIX) | 0.90 | 1.85 | 7.08 |
| WSVA (MIX) | 0.24 | 1.53 | 5.27 |
| WSVA + SS (MIX) | 0.28 | 1.49 | 5.65 |

The results shown in Tables 1 and 2 illustrate that weighted SVA scheme may be effective. For example, Table 1 shows that the WER in the MIX set was decreased from 7.08% to 5.27% when the performance was measured for highway conditions. This improvement corresponds to 26% WER reduction. The results also show that WER reduction may be further increased by using the spectral subtraction method. Significant potential improvement is also seen in the results in Table 2. In the MIX testing condition, the WER was decreased from 6.0% to 3.4% using the spectral subtraction method, corresponding to 43% WER reduction.

Table 3 shows test results using the acoustic models trained for a fixed point system. In the experiments, SVA and the weighted SVA were again evaluated with JAC, SBC, and SS. The SS for these experiments included a voice activity detection module which was not used in the SS for floating-point experiments. Noise level was estimated from the C0 component, which is the average of the log-spectral power, of the MFCC at the 10th frame. The resulting word error rates (WER) are shown in Table 3. In the results of Table 3, the weighting factor used is a function of $\Delta$noiselevel: $\omega=0.6$ if $\Delta$noiselevel$>8$ and $\omega=0.2$ otherwise.

TABLE 3

| Condition | WER |
| --- | --- |
| SVA + SS + SBC (CTG) | 1.27 |
| WSVA + SS + SBC (CTG) | 1.21 |
| SVA + SS (MIX) | 1.72 |
| WSVA + SS (MIX) | 1.63 |
| SVA + SS + SBC (MIX) | 1.39 |
| WSVA + SS + SBC (MIX) | 1.24 |

The results in Table 3 show that the weighted SVA may consistently improve speech recognition performance under noisy conditions. For example, when SS is used in conjunction with weighted SVA, the WER in the MIX set was decreased from 1.72% to 1.63%, corresponding to a 5% WER reduction. Further, weighted SVA used in conjunction with SBC and SS yielded a further decrease of the WER to 1.24%.

Figure 6:
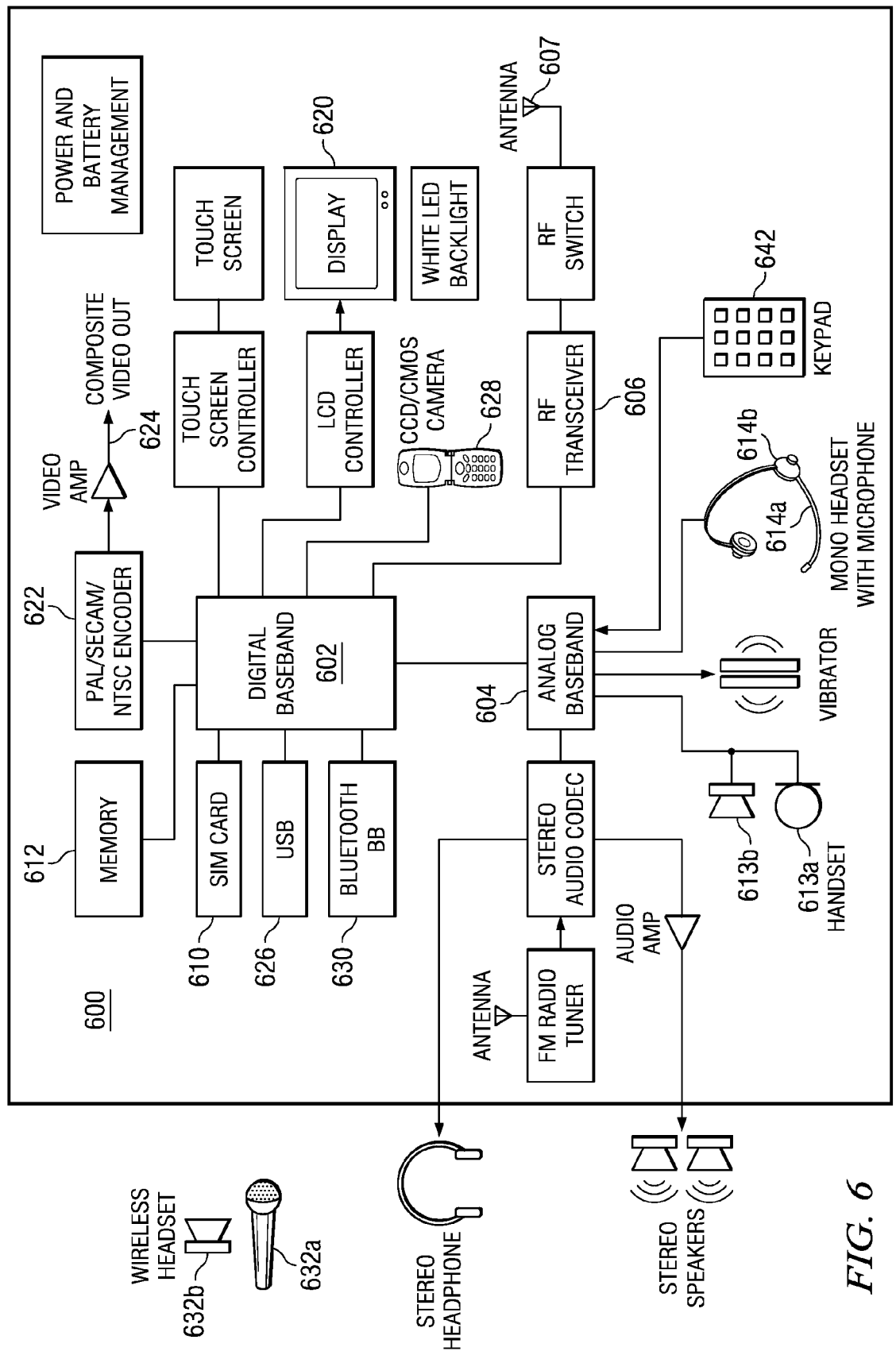
FIG. 6 shows a block diagram of a mobile device in accordance with one or more embodiments of the invention.
Figure 7:
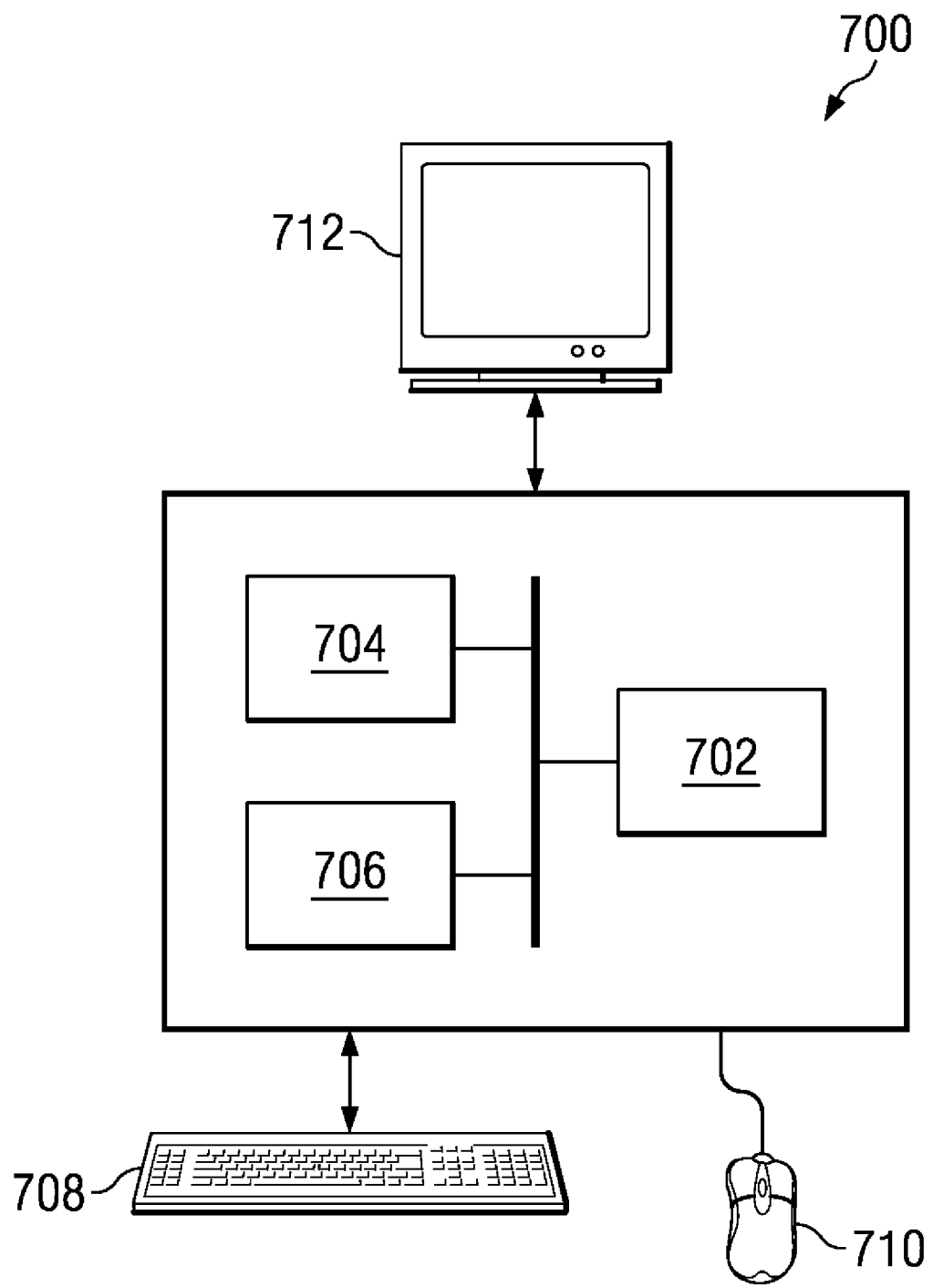
FIG. 7 shows an illustrative digital system in accordance with one or more embodiments of the invention.

Embodiments of the methods and systems for adapting acoustic models used in automatic speech recognition described herein may be implemented on virtually any type of digital system equipped to accept speech signals (e.g., a desk top computer, a laptop computer, a digital video recorder, a handheld mobile device such as a cellular telephone, etc.). FIGS. 6 and 7 are illustrative block diagrams of two such digital systems in accordance with one or more embodiments of the invention.

FIG. 6 is a block diagram of a mobile cellular phone (600) configured to perform automatic speech recognition using the modified SVA described herein. The digital baseband (DBB) unit (602) can include a digital processing processor system (DSP) that includes embedded memory and security features. The analog baseband unit (604) receives a voice data stream from handset microphone (613a) and sends a voice data stream to the handset mono speaker (613b). The analog baseband unit (604) also receives a voice data stream from the microphone (614a) and sends a voice data stream to the mono headset (614b). The voice data streams from either of these microphones may be used for automatic speech recognition in which the modified SVA is used. Usually, the analog baseband unit (604) and the digital baseband unit (602) are separate ICs. In many embodiments, the audio baseband unit (604) does not embed a programmable processor core, but performs processing based on configuration of audio paths, filters, gains, etc being setup by software running on the DBB (602). In some embodiments, the audio baseband processing is performed on the same processor that performs DBB processing. In other embodiments, a separate DSP or other type of processor performs the audio baseband processing.

The RF transceiver (606) includes a receiver for receiving a stream of coded data frames and commands from a cellular base station via an antenna (607) and a transmitter for transmitting a stream of coded data frames to the cellular base station via the antenna (607). The RF transceiver (606) is connected to the DBB (602) which provides processing of the frames of encoded data being received and transmitted by the cellular telephone (600).

The DBB unit (602) may send or receive data to various devices connected to universal serial bus (USB) port (626). The DBB (602) is connected to the subscriber identity module (SIM) card (610) and stores and retrieves information used for making calls via the cellular system. The DBB (602) is also connected to the memory (612) that augments the onboard memory and is used for various processing needs. The DBB (602) is connected to Bluetooth baseband unit (630) for wireless connection to a microphone (632a) and headset (632b) for sending and receiving voice data. The DBB (602) is connected to display (620) and can send information to it for interaction with a user of the cellular telephone (600) during a call process or other processing. The display (620) may also display pictures received from the network, from a local camera (628), or from other sources such as the USB (626). The DBB (602) may also send a video stream to the display (620) that is received from various sources such as the cellular network via the RF transceiver (606) or the camera (626). The DBB (602) may also send a video stream to an external video display unit via the encoder (622) over a composite output terminal (624). The encoder unit (622) may provide encoding according to PAL/SECAM/NTSC video standards.

Automatic speech recognition of speech signals received from the various microphones that uses the weighted SVA may be implemented by instructions stored in the memory (612) and executed by the DBB (602). More specifically, the noise estimator, the model adaptor, and the recognizer as discussed in reference to FIG. 1 may be implemented by instructions stored in the memory (612). Further, the acoustic models used for speech recognition may be stored in the memory (612).

FIG. 7 is a block diagram of an illustrative digital system (700) configured to perform automatic speech recognition using the modified SVA described herein. The digital system (700) includes a processor (702), associated memory (704), a storage device (706), and numerous other elements and functionalities typical of today's digital systems (not shown). In one or more embodiments of the invention, a digital system may include multiple processors and/or one or more of the processors may be digital signal processors. The digital system (700) may also include input means, such as a keyboard (708) and a mouse (710) (or other cursor control device), and output means, such as a monitor (712) (or other display device). The digital system ((700)) may also include microphone (not shown) for receiving speech signals. The digital system (700) may be connected to a network (714) (e.g., a local area network (LAN), a wide area network (WAN) such as the Internet, a cellular network, any other similar type of network and/or any combination thereof) via a network interface connection (not shown). Those skilled in the art will appreciate that these input and output means may take other forms.

Further, those skilled in the art will appreciate that one or more elements of the aforementioned digital system (700) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform automatic speech recognition using embodiments of the invention described herein may be stored on a computer readable medium such as a compact disc (CD), a diskette, a tape, a file, or any other computer readable storage device. The software instructions may be distributed to the digital system (700) via removable memory (e.g., floppy disk, optical disk, flash memory, USB key), via a transmission path (e.g., applet code, a browser plug-in, a downloadable standalone program, a dynamically-linked processing library, a statically-linked library, a shared library, compilable source code), etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method for adapting acoustic models in a speech recognition system, the method comprising:
   estimating noise in a portion of a speech signal;
   determining a first estimated variance scaling vector using an estimated 2-order polynomial and the noise estimation, wherein the estimated 2-order polynomial represents a priori knowledge of a dependency of a variance scaling vector on noise;
   determining a second estimated variance scaling vector using statistics from prior portions of the speech signal;
   determining a variance scaling factor using the first estimated variance scaling vector and the second estimated variance scaling vector; and
   using the variance scaling factor to adapt an acoustic model.

2. The method of claim 1, further comprising selecting an empirically determined weighting factor, wherein the determining a variance scaling factor further comprises using the weighting factor in the determination of the variance scaling factor.

3. The method of claim 2, wherein determining a variance scaling factor further comprises computing the sum of the first estimated variance scaling vector multiplied by the weighting factor and the second estimated variance scaling factor multiplied by the weighting factor subtracted from the number one.

4. The method of claim 2, wherein the weighting factor is selected based on an amount of change in noise level across previous portions of the speech signal.

5. The method of claim 4, wherein a first weighting factor is selected when the amount of change is less than a predetermined threshold and a second weighting factor is selected when the amount of change exceeds the predetermined threshold.

6. The method of claim 5, wherein the first weighting factor is 0.2 and the second weighting factor is 0.6.

7. The method of claim 1, wherein the estimated 2-order polynomial is obtained by minimum square estimation of a 2-order polynomial regression on a plurality of variance scaling vectors, wherein the plurality of variance scaling vectors are estimated from speech signals collected under noisy conditions, wherein estimation of a variance scaling vector for a portion of a speech signal is performed using statistics from prior portions of the speech signal.

8. The method of claim 1, wherein the portion of the speech signal comprises an utterance.

9. The method of claim 1 wherein determining the second estimated variance scaling vector further comprises computing $$\rho = \frac{\sum_{mt} \gamma_m(t) \left[ \frac{-1}{2} + \frac{1}{2}(Y(t)-\mu)^2 \Sigma^{-1} \exp(-\rho) \right]}{\sum_{mt} \gamma_m(t) \left[ \frac{-1}{2}(Y(t)-\mu)^2 \Sigma^{-1} \exp(-\rho) \right]}$$

where ρ is a previous estimate of the second estimated scaling vector, γm(t) is the posterior probability of state m at time t, μ denotes the mean of an acoustic model, and Σ denotes a variance vector of the acoustic model.

10. The method of claim 1, wherein determining the first estimated variance scaling vector further comprises computing $$\hat{a}N^2 + \hat{b}N + \hat{c}$$

where N is the noise estimation, and $\hat{a}$, $\hat{b}$, and $\hat{c}$ are regression coefficients from a mean square estimation of a 2-order polynomial regression determined from speech signals collected under noisy conditions.

11. A speech recognition system embodied in a digital system, the speech recognition system comprising:
  a microphone;
  a plurality of acoustic models stored in a memory of the digital system;
  a speech recognizer operatively connected to the microphone to receive a speech signal and configured to use the acoustic models to recognize speech in the speech signal; and
  a model adaptor subsystem operatively connected to the microphone to receive the speech signal and configured to adapt at least one acoustic model of the plurality of acoustic models by
    estimating noise in a portion of the speech signal;
    determining a first estimated variance scaling vector using an estimated 2-order polynomial and the noise estimation, wherein the estimated 2-order polynomial represents a priori knowledge of a dependency of a variance scaling vector on noise;
    determining a second estimated variance scaling vector using statistics from prior portions of the speech signal;
    determining a variance scaling factor using the first estimated variance scaling vector and the second estimated variance scaling vector; and
    using the variance scaling factor to adapt the at least one acoustic model.

12. The speech recognition system of claim 11, wherein the model adaptor subsystem is further configured to select an empirically determined weighting factor, wherein the determining a variance scaling factor further comprises using the weighting factor in the determination of the variance scaling factor.

13. The speech recognition system of claim 12, wherein the weighting factor is selected based on an amount of change in noise level across previous portions of the speech signal.

14. The speech recognition system of claim 13, wherein a first weighting factor is selected when the amount of change is less than a predetermined threshold and a second weighting factor is selected when the amount of change exceeds the predetermined threshold.

15. The speech recognition system of claim 14, wherein the first weighting factor is 0.2 and the second weighting factor is 0.6.

16. The speech recognition system of claim 11, wherein the estimated 2-order polynomial is obtained by minimum square estimation of a 2-order polynomial regression on a plurality of variance scaling vectors, wherein the plurality of variance scaling vectors are estimated from speech signals collected under noisy conditions, wherein estimation of a variance scaling vector for a portion of a speech signal is performed using statistics from prior portions of the speech signal.

17. The speech recognition system of claim 11, wherein the portion of the speech signal comprises an utterance.

18. The speech recognition system of claim 11, wherein the digital system is comprised in a mobile device.

19. A digital system comprising:
  a microphone;
  a memory configured to store a plurality of acoustic models and a plurality of instructions; and
  a processor operatively coupled to the memory and configured to receive a portion of a speech signal from the microphone and to execute the plurality of instructions to perform a method for adapting at least one acoustic model of the plurality of acoustic models, the method comprising:
    estimating noise in the portion of the speech signal;
    determining a first estimated variance scaling vector using an estimated 2-order polynomial and the noise estimation, wherein the estimated 2-order polynomial represents a priori knowledge of a dependency of a variance scaling vector on noise;
    determining a second estimated variance scaling vector using statistics from prior portions of the speech signal;
    determining a variance scaling factor using the first estimated variance scaling vector and the second estimated variance scaling vector; and
    using the variance scaling factor to adapt the at least one acoustic model.

20. The digital system of claim 19, wherein the method further comprises selecting an empirically determined weighting factor, wherein the determining a variance scaling factor further comprises using the weighting factor in the determination of the variance scaling factor.

* * * * *